(12) United States Patent
Guzzo

(10) Patent No.: US 10,969,554 B2
(45) Date of Patent: Apr. 6, 2021

(54) FIBER OPTIC TRAY SYSTEMS

(71) Applicant: AFL Telecommunications LLC, Duncan, SC (US)

(72) Inventor: Lou Guzzo, Inman, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 16/448,699

(22) Filed: Jun. 21, 2019

(65) Prior Publication Data
US 2020/0310060 A1    Oct. 1, 2020

Related U.S. Application Data

(60) Provisional application No. 62/827,291, filed on Apr. 1, 2019.

(51) Int. Cl.
*G02B 6/44* (2006.01)

(52) U.S. Cl.
CPC ......... *G02B 6/4452* (2013.01); *G02B 6/4441* (2013.01); *G02B 6/4454* (2013.01)

(58) Field of Classification Search
CPC ... G02B 6/4452; G02B 6/4441; G02B 6/4454
USPC ....................................................... 385/135
See application file for complete search history.

(56) References Cited

U.S. PATENT DOCUMENTS

| 2010/0322581 | A1  | 12/2010 | Cooke   |             |
|---|---|---|---|---|
| 2016/0033732 | A1* | 2/2016  | Giraud  | G02B 6/4452 |
|              |     |         |         | 385/135     |
| 2016/0062050 | A1* | 3/2016  | Giraud  | G02B 6/3825 |
|              |     |         |         | 385/56      |
| 2016/0252694 | A1* | 9/2016  | Sadasivan | G02B 6/4446 |
|              |     |         |         | 385/135     |
| 2017/0131500 | A1  | 5/2017  | Sauter  |             |
| 2019/0101717 | A1* | 4/2019  | Pilon   | G02B 6/4455 |

FOREIGN PATENT DOCUMENTS

EP          0871047 A1     10/1998

OTHER PUBLICATIONS

AFL Telecommunications LLC; International Patent Application No. PCT/US2020/022220; International Search Report; dated Jun. 12, 2020; (3 pages).

* cited by examiner

*Primary Examiner* — Jerry M Blevins
(74) *Attorney, Agent, or Firm* — Dority & Manning, P.A.

(57) ABSTRACT

A fiber optic tray system includes a tray. The tray includes a tray body, the tray body extending along a longitudinal axis between a front and a rear and extending along a lateral axis between a first side and a second side. The tray further includes a plurality of alignment rails, each of the plurality of alignment rails protruding from the tray body along a transverse axis. The tray further includes a plurality of retainer features disposed at the rear of the tray body. The fiber optic tray system further includes a fiber optic module, the fiber optic module including an outer housing and at least one retainment feature. The at least one retainment feature is interfaced with at least one of the plurality of retainer features to retain the fiber optic module on the tray.

21 Claims, 9 Drawing Sheets

FIBER OPTIC TRAY SYSTEMS

PRIORITY STATEMENT

The present application claims priority to U.S. Provisional Patent Application Ser. No. 62/827,291, filed Apr. 1, 2019, which is incorporated by reference herein in its entirety.

FIELD

The present disclosure relates generally to fiber optic tray systems, and more particularly to trays and modules having modular features which allow for differently-sized modules to be interchangeably aligned and retained on the trays.

BACKGROUND

Large data centers frequently deploy racks, cabinets, or enclosures which contain components for facilitating data communication, such as fiber optic connection components. For example, such racks, cabinets, or enclosures frequently contain a significant number of fiber optic modules, each of which facilitates multiple fiber optic connections. In many cases, the fiber optic modules are mounted on trays. The trays may be movable relative to the racks, cabinets, or enclosures, and the modules may be movable relative to the trays, to facilitate ease of installation and maintenance of the modules and fiber optic connections therein.

Currently known trays and modules utilize various rail systems or other components to retain the modules to the trays. However, a significant limitation of such known designs is that only a single size and shape of module may be utilized with a tray so that the various components of the tray and module fit together to retain the module to the tray. In many cases, it would be desirable to utilize differently-sized fiber optic modules on a tray. For example, it would be desirable to utilize differently-sized modules on the same tray and/or replace a module of one size with a module of a different size.

Accordingly, improved trays, modules, and tray systems are desired in the art.

BRIEF DESCRIPTION

Aspects and advantages of the invention will be set forth in part in the following description, or may be obvious from the description, or may be learned through practice of the invention.

In accordance with one embodiment, a fiber optic tray system defining a mutually orthogonal coordinate system having a longitudinal axis, a lateral axis, and a transverse axis is provided. The fiber optic tray system includes a tray. The tray includes a tray body, the tray body extending along the longitudinal axis between a front and a rear and extending along the lateral axis between a first side and a second side. The tray further includes a plurality of alignment rails, each of the plurality of alignment rails protruding from the tray body along the transverse axis. The tray further includes a plurality of retainer features disposed at the rear of the tray body. The fiber optic tray system further includes a fiber optic module, the fiber optic module including an outer housing and at least one retainment feature. The at least one retainment feature is interfaced with at least one of the plurality of retainer features to retain the fiber optic module on the tray.

In accordance with another embodiment, a fiber optic tray system defining a mutually orthogonal coordinate system having a longitudinal axis, a lateral axis, and a transverse axis is provided. The fiber optic tray system includes a tray. The tray includes a tray body, the tray body extending along the longitudinal axis between a front and a rear and extending along the lateral axis between a first side and a second side. The tray further includes a plurality of alignment rails, each of the plurality of alignment rails protruding from the tray body along the transverse axis. The tray further includes a plurality of retainer clips disposed at the rear of the tray body. The fiber optic tray system further includes a fiber optic module, the fiber optic module including an outer housing, at least one alignment channel defined in the outer housing, and at least one retainment plug. The fiber optic module is alignable and retainable by movement of the fiber optic module relative to the tray along the longitudinal axis such that the at least one alignment channel is provided on at least one of the plurality of alignment rails to align the fiber optic module on the tray and such that the at least one retainment plug is captured by at least one of the plurality of retainer clips to retain the fiber optic module on the tray.

In some embodiments, a fiber optic module may be alignable and retainable by movement of the fiber optic module relative to the tray along the longitudinal axis.

In some embodiments, a fiber optic module is a plurality of fiber optic modules. In some embodiments, each of the plurality of fiber optic modules has a differently-sized outer housing from others of the plurality of fiber optic modules.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF FIGURES

A full and enabling disclosure of the present invention, including the best mode thereof, directed to one of ordinary skill in the art, is set forth in the specification, which makes reference to the appended figures, in which.

DETAILED DESCRIPTION

Figure 1:
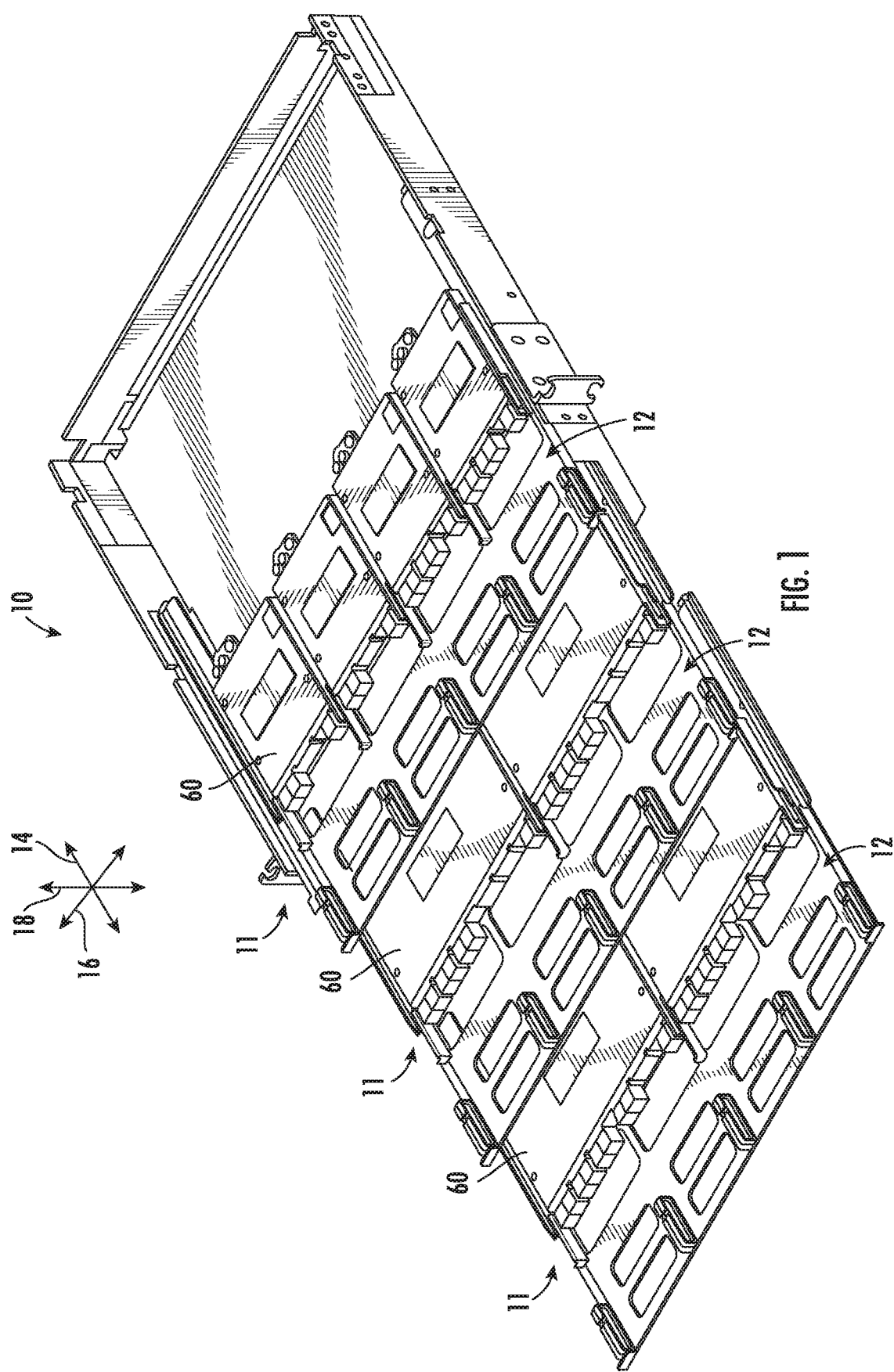
FIG. 1 is a top perspective view of an enclosure housing a plurality of trays, each tray containing a plurality of fiber optic modules, in accordance with embodiments of the present disclosure.
Figure 2:
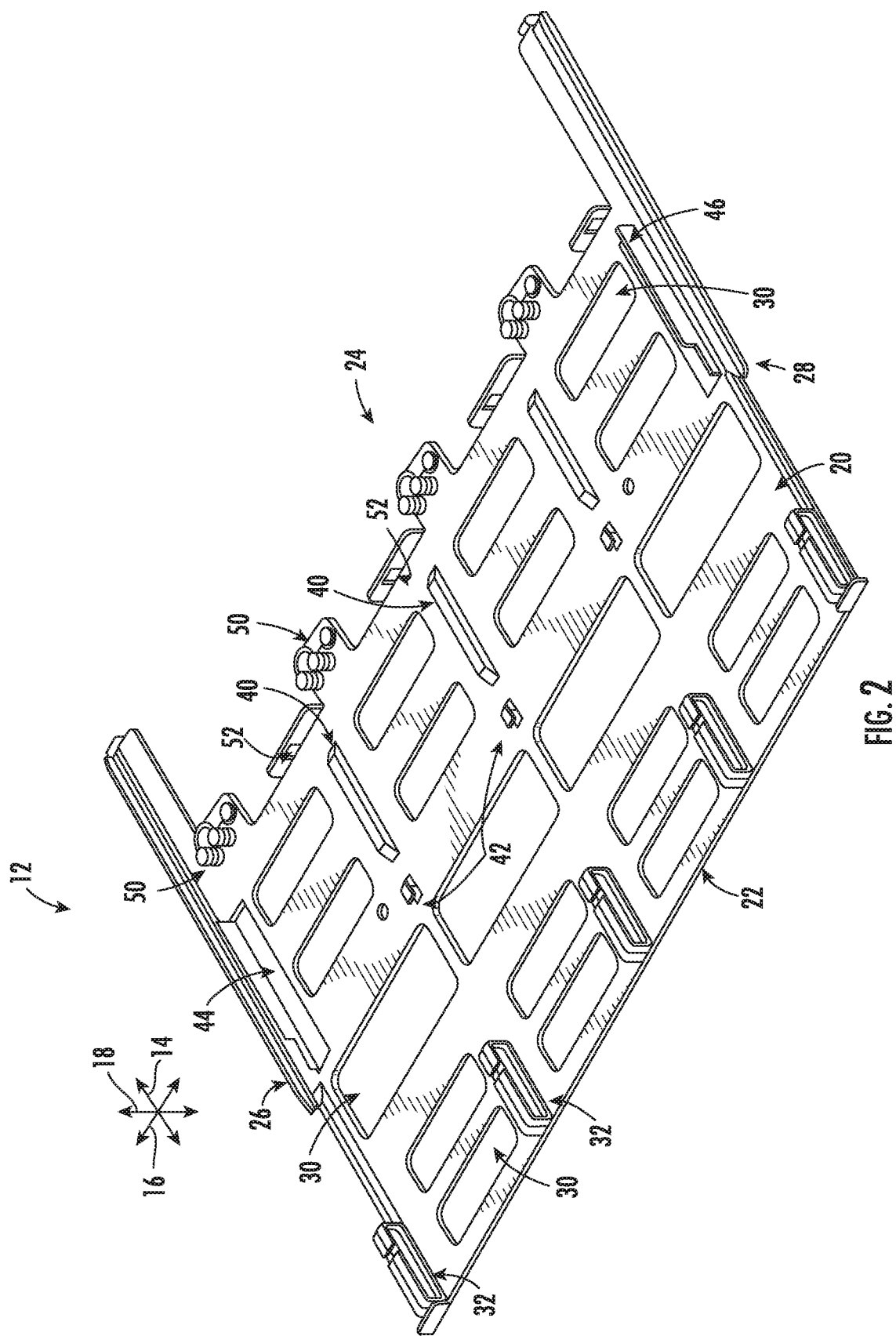
FIG. 2 is a top perspective view of a tray in accordance with embodiments of the present disclosure.
Figure 3:
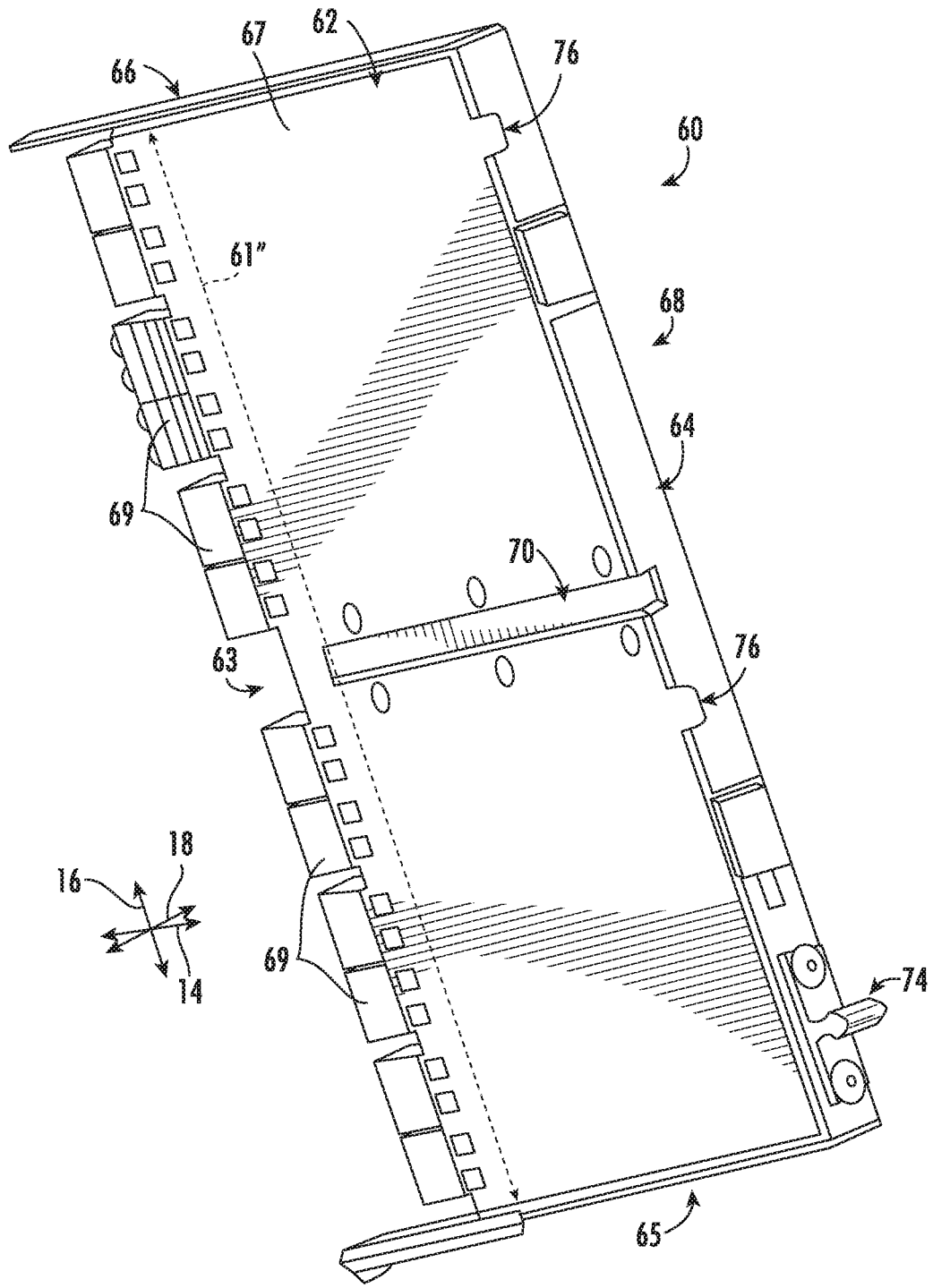
FIG. 3 is a bottom perspective view of a fiber optic module in accordance with embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to FIGS. 1 through 9, embodiments of enclosures 10 and fiber optic tray systems 11 in accordance with the present disclosure are utilized. It should be understood that tray systems 11 in accordance with the present disclosure need not necessarily be utilized in enclosures 10, and rather than tray systems 11 may be utilized in racks, cabinets, or another other suitable environment. In particular, tray systems 11 are suitable for use in high density environments, but it should be understood that the application of tray systems 11 in accordance with the present disclosure is not limited to such environments.

A mutually orthogonal coordinate system may be defined for a tray system 11 and enclosure 10 in accordance with the present disclosure. The coordinate system may include a longitudinal axis 14, a lateral axis 16, and a transverse axis 18, each of which may be mutually orthogonal to the others in the coordinate system.

As shown in FIG. 1, an enclosure 10 and/or tray system 11 in accordance with the present disclosure may house one or more trays 12. Each tray 12 may include one or more fiber optic modules 60 which are aligned and retained thereon. For example, a plurality of trays 12 stacked along the transverse axis 18 may be provided. Each tray may be independently movable relative to the enclosure, such as along the longitudinal axis 14. Such movement may facilitate ease of access to the modules 60 which are aligned and retained on the tray 12 for connection, maintenance, and disconnection purposes.

Referring now to FIGS. 2 and 6 through 9, trays 12 in accordance with embodiments of the present disclosure are provided. A tray 12 may, for example, include a tray body 20. The tray body 20 may extend along the longitudinal axis 14 between a front 22 and a rear 24, and may extend along the lateral axis 16 between a first side 26 and a second side 28. In some exemplary embodiments, cutouts 30 may be defined in the tray body 20 for various purposes such as weight reduction. A tray body 20 may in exemplary embodiments be a relative thin sheet of material, such as sheet metal. However, it should be understood that the present disclosure is not limited to such materials.

In some embodiments, a plurality of fiber management features 32, such as fiber management rings as shown, may be provided on a tray 12. Such features 32 may allow for routing of input optical fibers and cables which are connected to modules 60 provided on the tray 12. Such features 32 may, for example, be located at the front 22 of the tray, and may be spaced apart from each other along the lateral axis 16.

A tray 12 in accordance with the present disclosure may further advantageously include various features for aligning and retaining modules 60 thereon. In particular, such features may advantageously be utilized interchangeably with a variety of sizes of modules 60. Alignment features in accordance with the present disclosure may generally align modules 60 in the tray 12, and retainer features in accordance with the present disclosure may generally retain the modules 60 in the aligned positions.

For example, a tray 12 may include one or more, such as in exemplary embodiments a plurality of, alignment rails 40. Each rail 40 may protrude from the tray body 20, such as along the transverse axis 18. The alignment rails 40 may be spaced apart from each other, such as at equal distances from neighboring alignment rails 40. In exemplary embodiments, the alignment rails 40 may be spaced apart from each other along the lateral axis 16. In exemplary embodiments, each rail 40 may further extend along the longitudinal axis 14, such that a length of the rail 40 is generally aligned along the longitudinal axis 14. In exemplary embodiments, the rails 40 are parts of the tray body 20 which are processed to protrude from the body 20 as discussed herein.

A tray 12 may further include one or more, such as in exemplary embodiments a plurality of, alignment clips 42. Each clip 42 may protrude from the tray body 20, such as along the transverse axis 18. The alignment clips 42 may be spaced apart from each other, such as at equal distances from neighboring alignment clips 42. In exemplary embodiments, the alignment clips 42 may be spaced apart from each other along the lateral axis 16. Further, in exemplary embodiments, each clip 42 may be aligned with one of the plurality of alignment rails 40 along the longitudinal axis 14. In exemplary embodiments, the rails 40 are parts of the tray body 20 which are processed to protrude from the body 20 as discussed herein.

Tray 12 may further include a first side rail 44 which extends from the tray body 20, such as along the transverse axis 18, and a second side rail 46 which extends from the tray body 20, such as along the transverse axis 18. The first side rail 44 may be disposed at the first side 26 of the tray body 20, and the second side rail 46 may be disposed at the second side 28 of the tray body 20. Such rails 44, 46 may, for example, be proximate the rear 24 of the tray body 20. In exemplary embodiments, the rails 44, 46 may be portions of the tray body 20 which are, for example, bent into position so that they extend from the body 20, as discussed herein.

As discussed, tray 12 may further include one or more retainer features. The retainer features may be disposed at the rear 24 of the tray body 20.

For example, tray 12 may include one or more retainer clips 50, such as in exemplary embodiments a plurality of retainer clips 50. In some embodiments, each retainer clip 50 may generally include two rollers between which a plug may be inserted for retainment purposes, as discussed herein. The retainer clips 50 may be spaced apart from each other, such as at equal distances from neighboring retainer clips 50.

Additionally or alternatively, tray 12 may include one or more one or more retainer slots 52. Retainer slots 52 may, for example, be defined in tabs which are disposed at the rear 24 of the tray body 20. In exemplary embodiments the tabs may be portions of the tray body 20 which are, for example, bent into position so that they extend from the body 20, as discussed herein. The retainer slots 52 may be spaced apart from each other, such as at equal distances from neighboring retainer slots 52.

Referring now to FIGS. 1 and 3 through 9, fiber optic modules 60 in accordance with embodiments of the present disclosure are provided. A fiber optic module may have any suitable optical functionality as required per application. For example, in exemplary embodiments, a fiber optic module 60 may be a wavelength division multiplexing (WDM) module. In alternative embodiments, the fiber optic module 60 may be a patch module, splice module, splitter module, or other suitable module (also referred to in some embodiments as a cassette). The module 60 may have various internal fiber optic features, such as WDM components, splitter components, splice components, optical fibers, optical fiber connectors, etc. as required per application.

A module 60 in accordance with the present disclosure may include an outer housing 62. Outer housing 62 may house the various internal features as discussed herein. When installed in a tray 12, outer housing 62 may extend along the longitudinal axis 14 between a front 63 and a rear 64, along the lateral axis 16 between a first side 65 and a second side 66, and along the transverse axis 18 between a bottom 67 and a top 68. Module 60 may further include one or more fiber optic adapters 69 which extend from the outer housing 62 (such as in exemplary embodiments from the front 63 and/or rear 64) and facilitate external fiber optic connections to the internal components.

A module 60 in accordance with the present disclosure may have various alignment and retainment features which correspond to alignment and retainer features of the tray 12, such that the module 60 can be aligned and retained on the tray 12. In exemplary embodiments, movement of the module 60 relative to the tray 12, such as along the longitudinal axis 14 (as well as positioning along the lateral axis 16 and transverse axis 18), may cause such alignment and retention.

A module 60 in accordance with the present disclosure can have one of a variety of sizes, and in exemplary embodiments can utilize the alignment and retainer features of the tray 12 no matter which of the variety of sizes the module 60 is. Accordingly, modules 60 of different sizes may advantageously be interchangeable aligned and retained on a tray 12. A plurality of module 60 may be provided on a tray 12. Each outer module 60 may have the same-sized outer housing 62 or a differently-size outer housing 62. Each of the plurality of modules 60 may be interchangeably alignable and retainable on the tray 12, such as using one or more alignment features and/or retainer features of the tray 12 as discussed herein.

Figure 4:
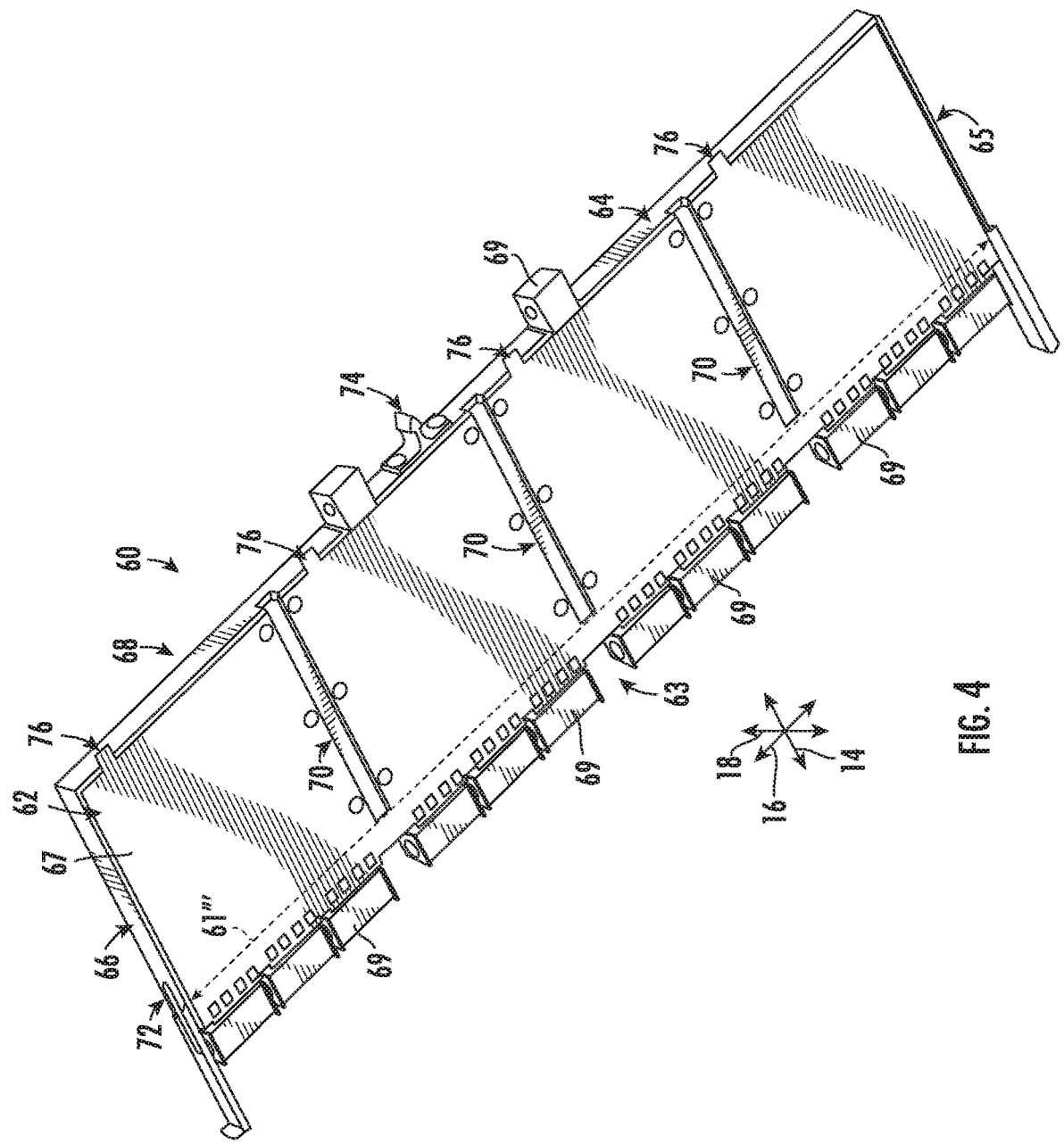
FIG. 4 is a bottom perspective view of another fiber optic module in accordance with embodiments of the present disclosure.
Figure 5:
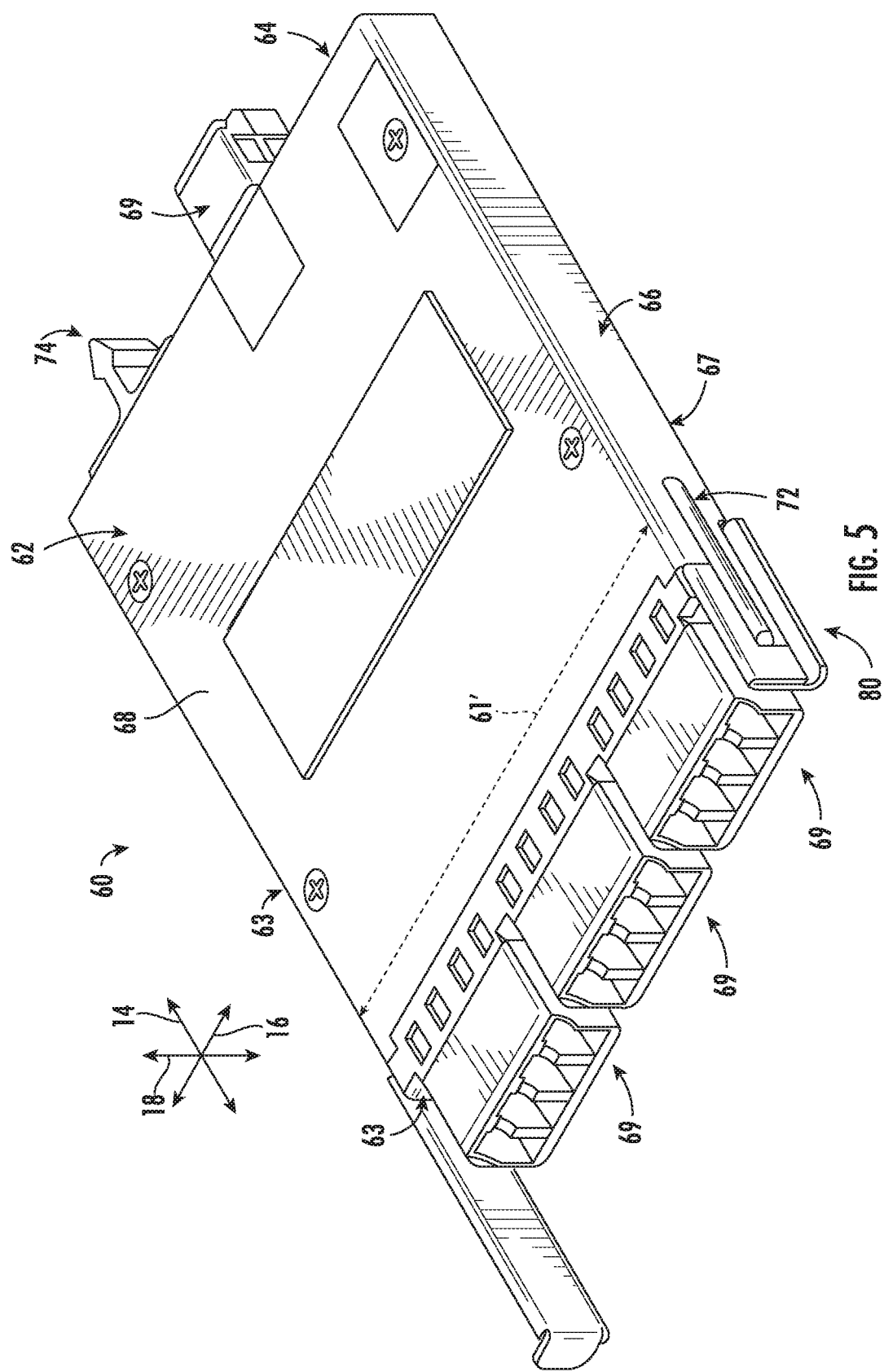
FIG. 5 is a top perspective view of yet another fiber optic module in accordance with embodiments of the present disclosure.
Figure 6:
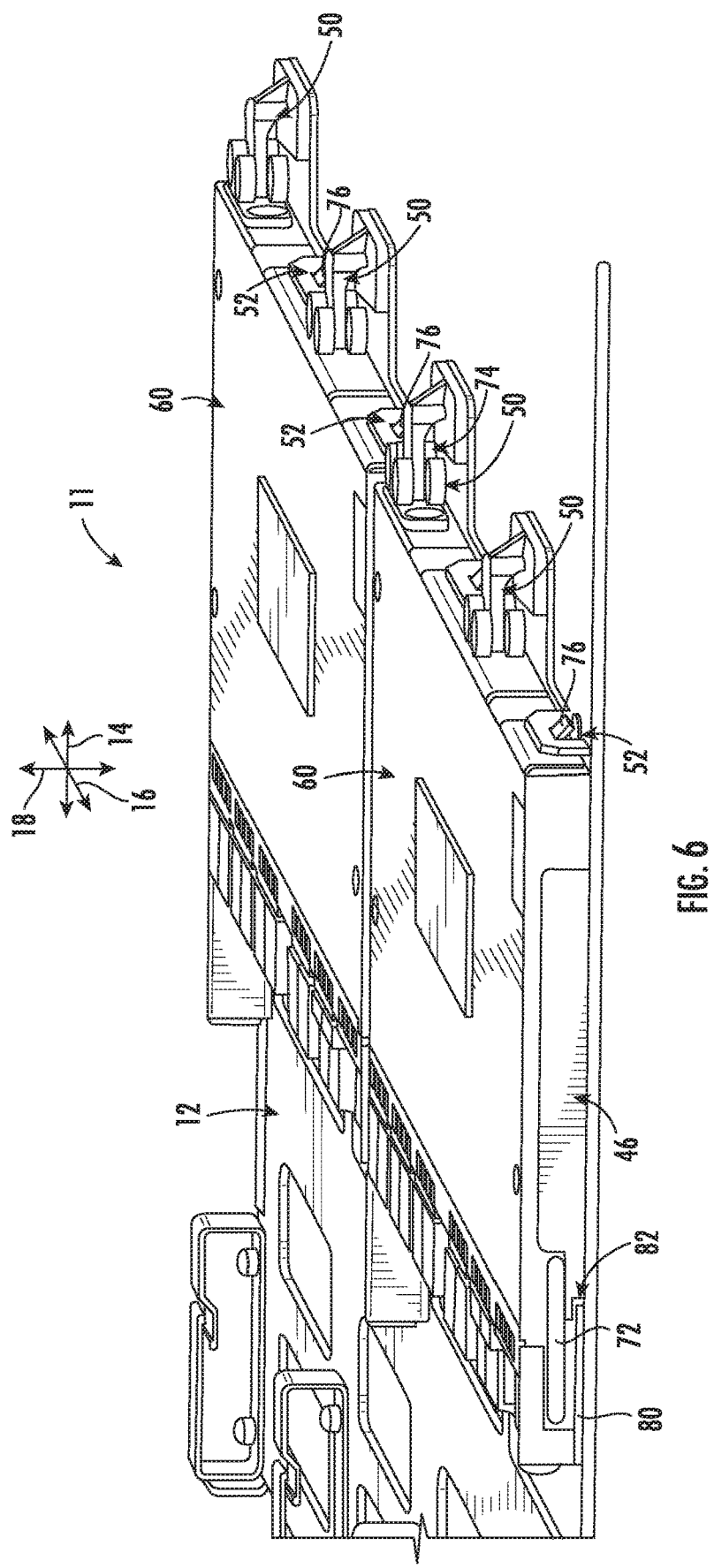
FIG. 6 is a side perspective view of a plurality of fiber optic modules aligned and retained in a tray in accordance with embodiments of the present disclosure.
Figure 7:
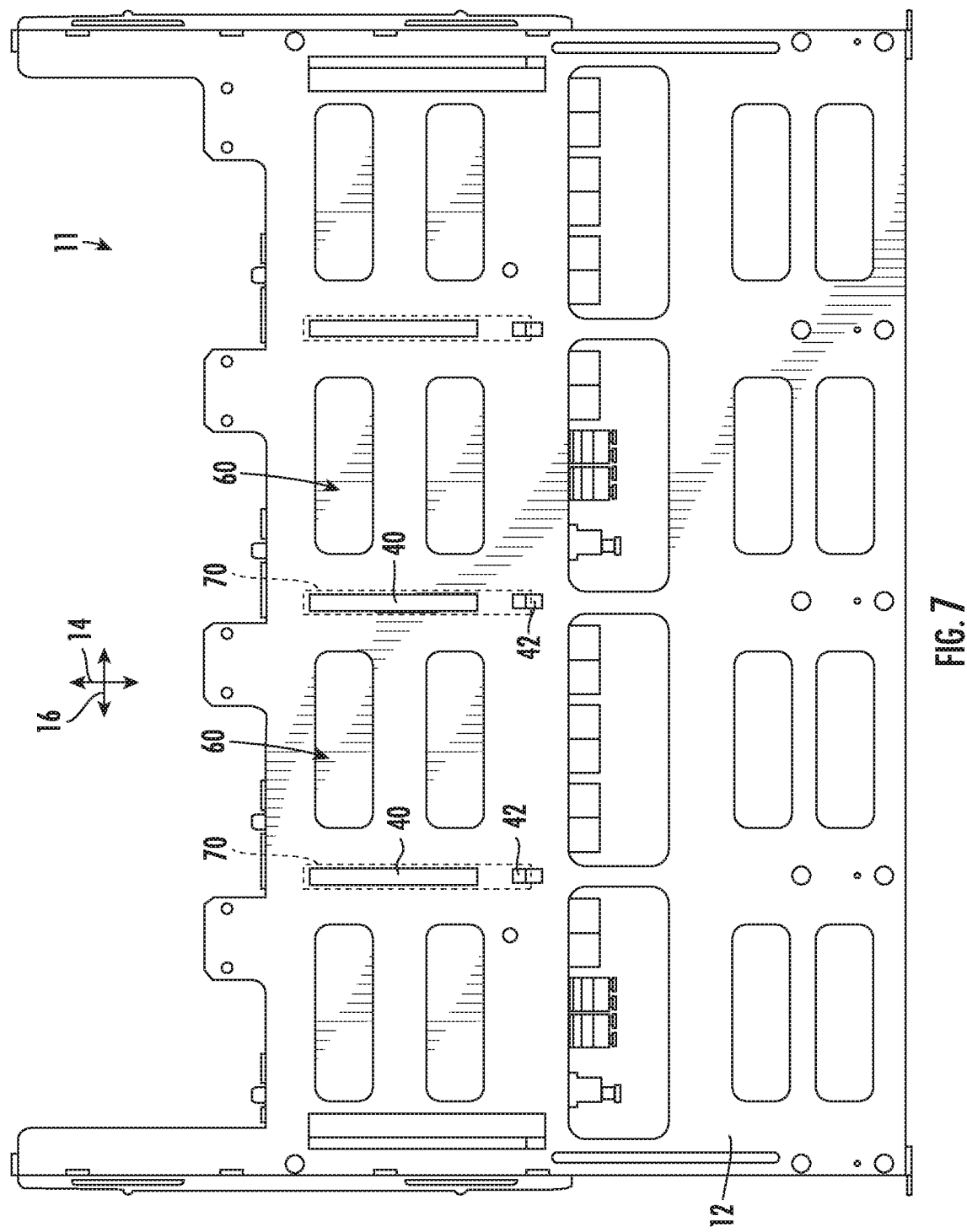
FIG. 7 is a bottom view of a plurality of fiber optic modules aligned and retained in a tray in accordance with embodiments of the present disclosure.
Figure 8:
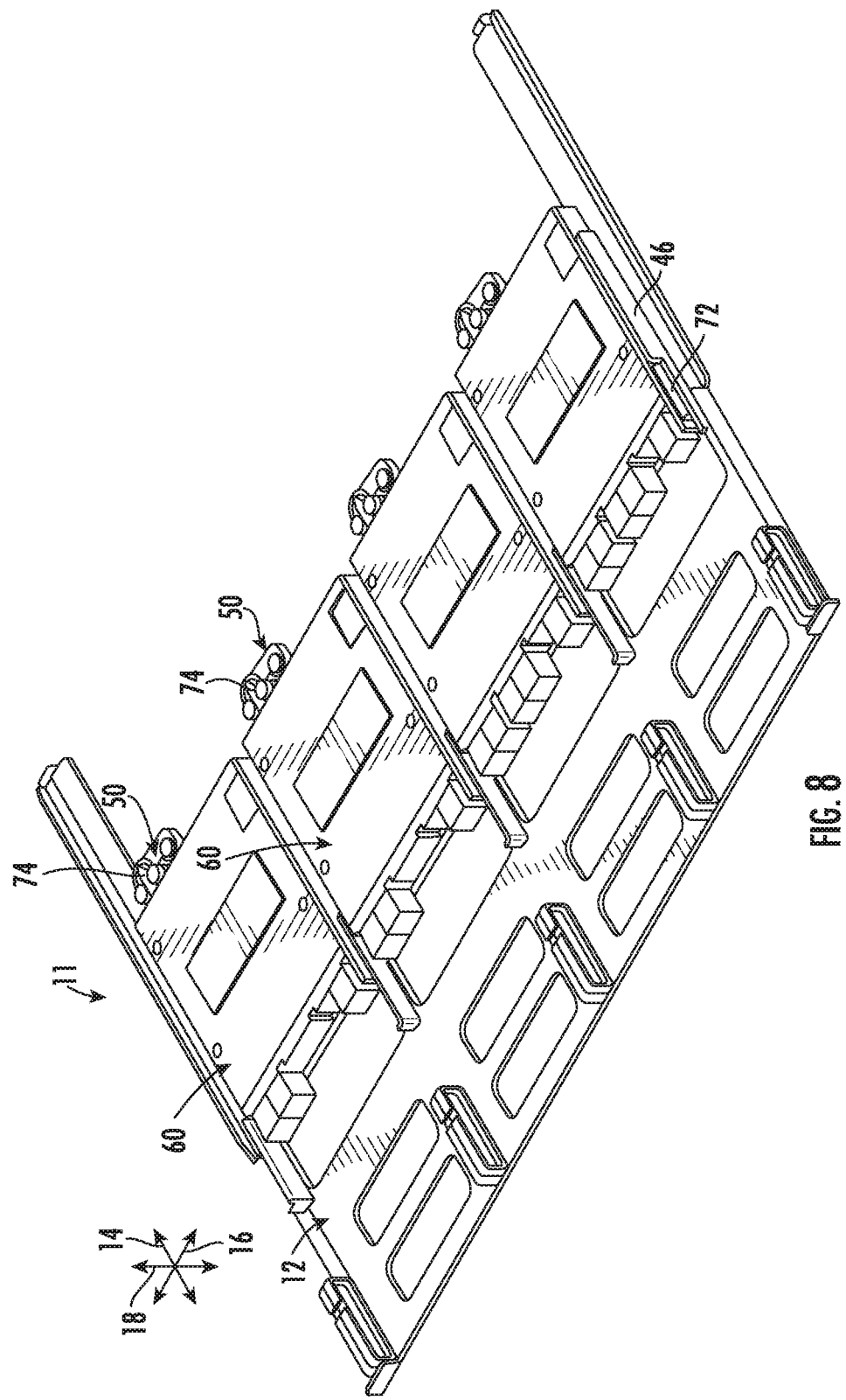
FIG. 8 is a top perspective view of a plurality of fiber optic modules aligned and retained in a tray in accordance with embodiments of the present disclosure.
Figure 9:
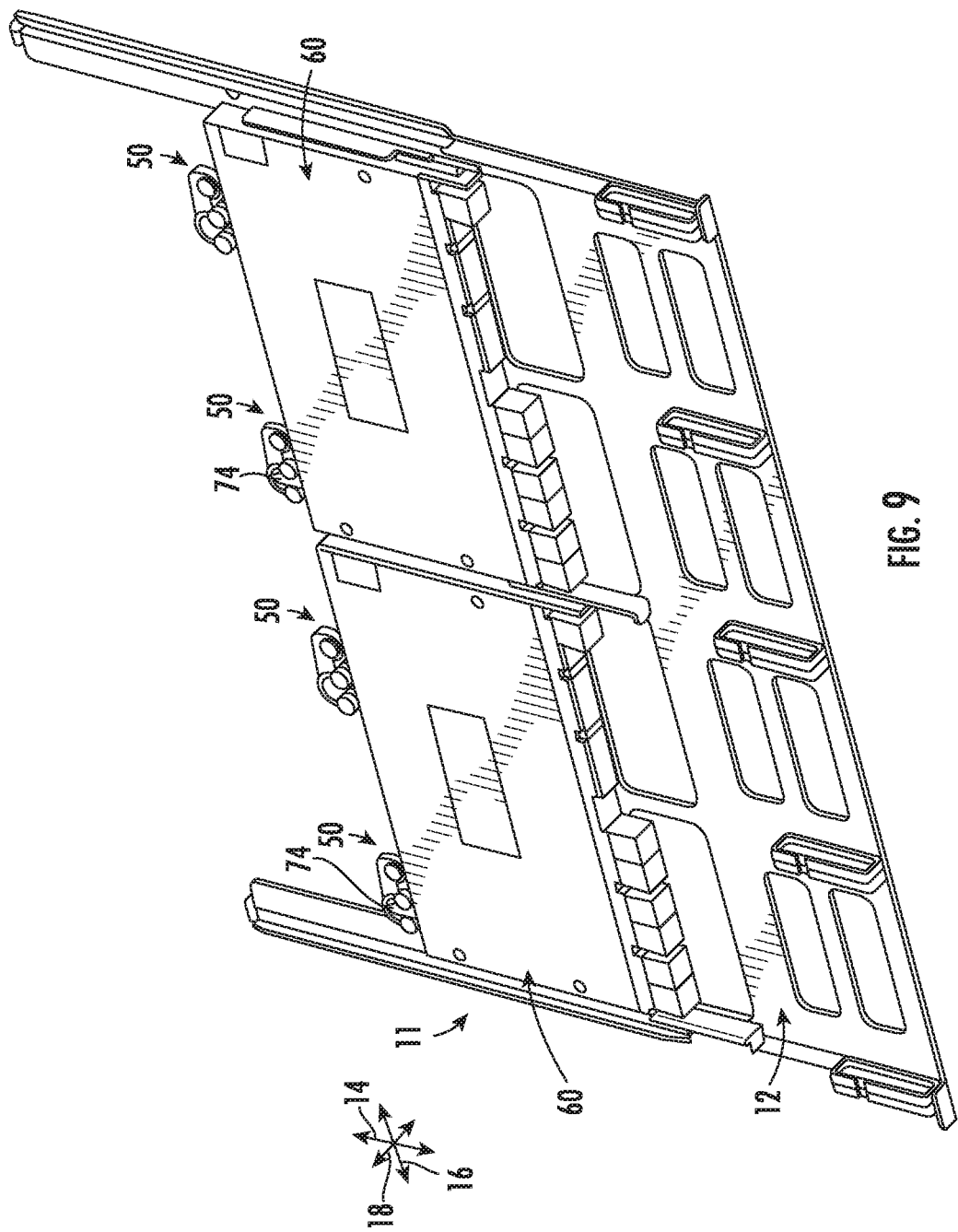
FIG. 9 is a top perspective view of another plurality of fiber optic modules aligned and retained in a tray in accordance with embodiments of the present disclosure.

For example, modules 60 having varying widths 61 (along the lateral axis 16) are illustrated. FIGS. 1, 5, and 8 illustrate a module 60 having a first width 61'. FIGS. 3, 6, 7, and 9 illustrate a module 60 having a second width 61". FIG. 4 illustrates a module 60 having a third width 61'". The first width 61' is the smallest, being less than the second width 61" and third width 61'". The second width 61" is greater than the first width 61' and less than the third width 61'". The third width 61'" is the largest, being greater than the first width 61' and second width 61". Modules 60 having any of widths 61', 61", 61'" may be interchangeably aligned and retained in a tray 12 in accordance with the present disclosure.

For example, a module 60 may, in some embodiments, include one or more alignment channels 70. Each alignment channel 70 may be defined in the outer housing 62, such as in the bottom 67 of the outer housing 62. A module 60 having second width 61" may, for example, include a single alignment channel 70. A module 60 having third width 61'" may, for example, include a plurality of alignment channels 70, such as three alignment channels 70 as shown. A module 60 having a first width 61' may not require an alignment channel 70, such as because the width 61' is too small for an alignment channel 70 to be necessary. Any suitable number of alignment channels 70, such as zero, one, two, three, four, or more, may be utilized as necessary. When multiple alignment channels 70 are utilized, the alignment channels 70 may be spaced apart from each other, as at the same distance that the alignment rails 40 are spaced apart from each other. In exemplary embodiments, the alignment channels 70 may be spaced apart from each other along the lateral axis 16. In exemplary embodiments, each channel 70 may further extend along the longitudinal axis 14, such that a length of the channel 70 is generally aligned along the longitudinal axis 14.

In some embodiments when a module 60 is mounted to a tray 12, such as in embodiment wherein the module 60 includes one or more alignment channels 70, each alignment channel 70 may be provided on a corresponding alignment rail 40. For example, the module 60 may be oriented along the lateral axis 16 and transverse axis 18, and then traversed along the longitudinal axis 14, such that the rail(s) 40 are provided in the channel(s) 70. In embodiments when a module 60 does not include an alignment channel 70, the module 60 may be provided between neighboring rail(s) 40. For example, the module 60 may be oriented along the lateral axis 16 and transverse axis 18 and then traversed along the longitudinal axis 14 between neighboring rails(s) 40.

Further, in some embodiments when a module 60 is mounted to a tray 12, such as in embodiment wherein the module 60 includes one or more alignment channels 70, each alignment channel 70 may be provided on a corresponding alignment clip 42. For example, the module 60 may be oriented along the lateral axis 16 and transverse axis 18, and then moved along the longitudinal axis 14, such that the clip(s) 42 are provided in the channel(s) 70 and the clip(s) 42 contact the outer housing 20 (such as a portion of the outer housing 20 defining the channel(s) 70. In embodiments when a module 60 does not include an alignment channel 70, the module 60 may be provided between neighboring clips 42. For example, the module 60 may be oriented along the lateral axis 16 and transverse axis 18 and then traversed along the longitudinal axis 14 between neighboring rails(s) 40.

The alignment rails 40 and clips 42, and their interactions with modules 60 (and channels 70 thereof) may advantageously facilitate the alignment of the modules 60 relative to the tray. For example, modules 60 having channels 70 may be appropriately positioned in the tray 12 along the lateral axis 16 via the interaction between the channels 70 and the rails 40 and/or clips 42. Further, modules 60 having channels 70 may be appropriately positioned in the tray 12 along the longitudinal axis 14 via the interaction between the clips 72 and the outer housing 20, such as via the contact of the clips 72 with the outer housing 20 defining the channels 70 such that further longitudinal movement is not permitted. Modules 60 which do not have channels 70 may be appropriately positioned in the tray by being between the rails 40 and/or clips 42.

A module 60 may further include one or more side protrusions 72. A side protrusion 72 may extend from the first side 65 or second side 66. In exemplary embodiments, a module 60 may include side protrusions 72 which extend from both the first side 65 and second side 66. A side protrusion 72 may, in some embodiment, be mountable on and thus in contact with a side rail 44 or 46 when a module 60 is provided on a tray 12, thus further aligning the module 60 relative to the tray 12 (such as along the lateral axis 14 and/or transverse axis 18). For example, when a module 60 having any suitable width 61 is positioned proximate the first side rail 44 and/or second side rail 46, the side protrusion(s) 72 may be mounted on and thus in contact with such side rail 44, 46.

A module 60 may further include one or more retainment features. Each retainment feature interfaces with a retainer feature of the tray 12 to retain the module 60 in an aligned position on the tray 12.

For example, a module 60 may include one or more retainer plugs 74. Each retainer plug 74 may, for example, extend from the outer housing 62, such as from the rear 64 thereof along the longitudinal axis 14. Each retainer plug 74 may be insertable into a retainer clip 50 to retain the module 60 in the tray 12. For example, a module may be moved along the longitudinal axis 14 (such as after orientation along the lateral axis 16 and transverse axis 18 as discussed herein). Such movement may align the module 60 relative to the tray 12, and may further retain the module 60 relative to the tray 12 once such movement causes insertion of the plug 74 into one of the clips 50.

Additionally or alternatively, a module 60 may include one or more retainer tabs 76. Each retainer tab 76 may, for example, extend from the outer housing 62, such as from the rear 64 thereof along the longitudinal axis 14. In exemplary embodiments, for example, the tabs 76 may be portions of the outer housing 62 which are, for example, bent into position so that they extends from the outer housing 62, as discussed herein. Each retainer tab 76 may be insertable into a retainer slot 52 to retain the module 60 in the tray 12. For example, a module may be moved along the longitudinal axis 14 (such as after orientation along the lateral axis 16 and transverse axis 18 as discussed herein). Such movement may align the module 60 relative to the tray 12, and may further retain the module 60 relative to the tray 12 once such movement causes insertion of the tab 76 into one of the slots 52.

Additionally or alternatively, a module 60 may include one or more side lips 80. A side lip 80 may extend from the first side 65 or second side 66. In exemplary embodiments, a module 60 may include side lips 80 which may extend from both the first side 65 and second side 66. A side lip 82 may, in some embodiments, be positionable within a slot 82 defined in a side rail 44 or 46 when a module 60 is provided on a tray 12, thus further retaining the module 60 relative to the tray 12.

As discussed, differently sized modules 60 (such as having different widths) may be utilized with a tray 12 in accordance with the present disclosure. Further, as discussed, modules 60 may be interchangeably aligned and retained in a tray 12, such as in a variety of different positions. Accordingly, for example, an alignment feature of a module 60 may interface with any one of a plurality of corresponding alignment features of the tray 12. For example, a channel 70 may be utilized with any one of a plurality of rails 40 and/or clips 42 of a tray 12. Additionally or alternatively, a retainer feature of a module 60 may interface with any one of a plurality of corresponding retention features of a tray 12. For example, a retainer plug 74 may be inserted into any one of a plurality of retainer clips 50 of the tray 12 and/or a retainer tab 76 may be inserted into any one of a plurality of retainer slots 52 of the tray 12. Such interfacing may advantageously align and/or retain the module 60 on the tray 12 in any suitable interchangeable position.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fiber optic tray system defining a mutually orthogonal coordinate system having a longitudinal axis, a lateral axis, and a transverse axis, the fiber optic tray system comprising:
   a tray, the tray comprising:
      a tray body, the tray body extending along the longitudinal axis between a front and a rear and extending along the lateral axis between a first side and a second side;
      a plurality of alignment rails, each of the plurality of alignment rails protruding from the tray body along the transverse axis; and
      a plurality of retainer features disposed at the rear of the tray body; and
   at least two fiber optic modules, the at least two fiber optic modules each comprising an outer housing and at least one retainment feature, wherein the at least one retainment feature of each of the at least two fiber optic modules is configured to interface with at least one of the plurality of retainer features to retain each of the fiber optic modules on the tray, wherein the at least two fiber optic modules have differently-sized outer housings as compared to one another, and wherein the tray is configured to simultaneously receive both of the at least two fiber optic modules.

2. The fiber optic tray system of claim 1, wherein the fiber optic module further comprises at least one alignment channel defined in the outer housing, wherein the at least one alignment channel is provided on at least one of the plurality of alignment rails to align the fiber optic module on the tray.

3. The fiber optic tray system of claim 1, wherein the plurality of alignment rails each extend along the longitudinal axis and are spaced apart from each other along the lateral axis.

4. The fiber optic tray system of claim 1, wherein the tray further comprises a plurality of alignment clips.

5. The fiber optic tray system of claim 4, wherein each of the plurality of alignment clips is aligned with one of the plurality of alignment rails along the longitudinal axis.

6. The fiber optic tray system of claim 1, wherein each of the plurality of retainer features is a retainer clip and each of the plurality of retainment features is a retainer plug.

7. The fiber optic tray system of claim 1, wherein each of the plurality of retainer features is a retainer slot and each of the plurality of retainment features is a retainer tab.

8. The fiber optic tray system of claim 1, wherein the tray further comprises a first side rail extending along the transverse axis from the tray body at the first side and a second side rail extending along the transverse axis from the tray body at the second side, and wherein the fiber optic module further comprises at least one side protrusion mountable on one of the first side rail or second side rail to align the fiber optic module on the tray.

9. The fiber optic tray system of claim 1, wherein the fiber optic module is alignable and retainable by movement of the fiber optic module relative to the tray along the longitudinal axis.

10. The fiber optic tray system of claim 1, wherein the tray is configured to receive the at least two fiber optic modules in at least two different relative arrangements.

11. The fiber optic tray system of claim 10, wherein each of the plurality of fiber optic modules is interchangeably alignable and retainable on the tray using one or more of the plurality of alignment rails and one or more of the plurality of retainer features.

12. The fiber optic tray system of claim 1, wherein the fiber optic module is a wavelength division multiplexing module.

13. A fiber optic tray system defining a mutually orthogonal coordinate system having a longitudinal axis, a lateral axis, and a transverse axis, the fiber optic tray system comprising:
  a tray, the tray comprising:
    a tray body, the tray body extending along the longitudinal axis between a front and a rear and extending along the lateral axis between a first side and a second side;
    a plurality of alignment rails, each of the plurality of alignment rails protruding from the tray body along the transverse axis; and
    a plurality of retainer clips disposed at the rear of the tray body; and
  a plurality of fiber optic modules, each of the plurality of fiber optic modules comprising an outer housing, at least one alignment channel defined in the outer housing, and at least one retainment plug, wherein each of the plurality of fiber optic modules is alignable and retainable by moving relative to the tray along the longitudinal axis such that the at least one alignment channel is provided on at least one of the plurality of alignment rails to align the fiber optic module on the tray and such that the at least one retainment plug is captured by at least one of the plurality of retainer clips to retain the fiber optic module on the tray, wherein the plurality of fiber optic modules is includes a first fiber optic module having a first sized outer housing and a second fiber optic module having a second sized outer housing, the second sized outer housing being different from the first sized outer housing, and wherein the tray is configured to simultaneously receive both the first and second fiber optic modules.

14. The fiber optic tray system of claim 13, wherein the plurality of alignment rails each extend along the longitudinal axis and are spaced apart from each other along the lateral axis.

15. The fiber optic tray system of claim 13, wherein the tray further comprises a plurality of alignment clips, and wherein the at least one alignment channel is provided on at least one of the plurality of alignment clips such that the at least one of the plurality of alignment clips contacts the outer housing to align the fiber optic module on the tray.

16. The fiber optic tray system of claim 15, wherein each of the plurality of alignment clips is aligned with one of the plurality of alignment rails along the longitudinal axis.

17. The fiber optic tray system of claim 13, wherein the tray further comprises a plurality of retainer slots defined at the rear of the tray body, wherein the fiber optic module further comprises a retainer tab, and wherein the retainer tab is inserted into the retainer slot to retain the fiber optic module on the tray.

18. The fiber optic tray system of claim 13, wherein the tray further comprises a first side rail extending along the transverse axis from the tray body at the first side and a second side rail extending along the transverse axis from the tray body at the second side, and wherein the fiber optic module further comprises at least one side protrusion mountable on one of the first side rail or second side rail to align the fiber optic module on the tray.

19. The fiber optic tray system of claim 13, wherein the tray is configured to receive the first and second fiber optic modules in at least two different relative arrangements.

20. The fiber optic tray system of claim 19, wherein each of the plurality of fiber optic modules is interchangeably alignable and retainable on the tray using one or more of the plurality of alignment rails and one or more of the plurality of retainer clips.

21. A fiber optic tray system comprising:
  a plurality of fiber optic modules including a first fiber optic module having a first width and a second fiber optic module having a second width different from the first width; and
  a tray comprising a tray body and a plurality of alignment rails protruding from the tray body, wherein the tray is configured to receive and selectively retain the first and second fiber optic modules simultaneously in a plurality of relative configurations relative to the plurality of alignment rails.

* * * * *